United States Patent
Kim et al.

(10) Patent No.: US 9,996,292 B2
(45) Date of Patent: Jun. 12, 2018

(54) MEMORY SYSTEM AND OPERATION METHOD THEREOF

(71) Applicant: SK hynix Inc., Gyeonggi-do (KR)

(72) Inventors: Dong-Gun Kim, Gyeonggi-do (KR); Jung-Hyun Kwon, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 13 days.

(21) Appl. No.: 15/192,786

(22) Filed: Jun. 24, 2016

(65) Prior Publication Data

US 2017/0242609 A1    Aug. 24, 2017

(30) Foreign Application Priority Data

Feb. 23, 2016  (KR) .................. 10-2016-0021167

(51) Int. Cl.
*G06F 3/06* (2006.01)

(52) U.S. Cl.
CPC .......... *G06F 3/0629* (2013.01); *G06F 3/0604* (2013.01); *G06F 3/0647* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,407,400 B2 | 3/2013 | Marotta et al. | |
| 8,825,941 B2 | 9/2014 | Moshayedi et al. | |
| 2011/0010489 A1* | 1/2011 | Yeh | G06F 12/0246 711/103 |
| 2012/0290768 A1* | 11/2012 | Rubowitz | G06F 12/0246 711/103 |
| 2014/0207997 A1* | 7/2014 | Peterson | G06F 12/0246 711/103 |
| 2016/0118110 A1* | 4/2016 | Kim | G11C 11/5628 365/185.03 |

* cited by examiner

*Primary Examiner* — Ann J Lo
*Assistant Examiner* — Brett P Lohmeier
(74) *Attorney, Agent, or Firm* — IP & T Group LLP (57) ABSTRACT

A memory system includes: a non-volatile memory device including a normal region in which Most Significant Bits (MSBs) and Least Significant Bits (LSBs) stored in memory cells are accessed simultaneously, a hot region in which MSBs stored in memory cells are accessed, and a cold region in which LSBs stored in memory cells are accessed; and a memory controller controlling the non-volatile memory device, Herein, the memory controller includes: a read/write counter that counts the number of read operations and the number of write operations that are performed for each of logical cluster to thereby produce a counting result; and a region selector that maps each logical cluster to one among the normal region, the hot region and the cold region based on the counting result to thereby produce mapping data.

15 Claims, 4 Drawing Sheets

MEMORY SYSTEM AND OPERATION METHOD THEREOF

CROSS-REFERENCE TO RELATED APPLICATIONS

The present application claims priority under 35 U.S.C. § 119(a) to Korean Patent Application No. 10-2016-0021167, filed on Feb. 23, 2016, which is incorporated herein by reference in its entirety.

BACKGROUND

1. Field

Exemplary embodiments of the present invention relate to a memory system including a non-volatile memory device and a memory controller.

2. Description of the Related Art

Semiconductor memory devices are generally categorized into volatile and non-volatile memory devices. Examples of volatile memory devices include a Dynamic Random Access Memory (DRAM) device and a Static Random Access Memory (SRAM) device. Examples of non-volatile memory devices include a Programmable Read Only Memory (PROM) device, an Erasable PROM (EPROM) device, an Electrically EPROM (EEPROM) device, and a flash memory device. A major difference between the volatile memory devices and the non-volatile memory devices is whether the data stored in the memory cells of the memory can be retained or not after a predetermined time passes.

Unlike non-volatile memory devices, volatile memory devices lose data stored in their memory cells after a predetermined time passes due to a small current leakage. For this reason, volatile memory devices require a refresh operation to keep their data. Non-volatile memory devices do not require a refresh operation to be performed. Since this feature of the non-volatile memory devices is appropriate for highly integrated low-power-consuming devices, the non-volatile memory devices are widely used as storage media for portable electronic devices.

Meanwhile, a flash memory device among the non-volatile memory devices stores data in a memory cell through a write operation and an erase operation. In a flash memory, the write operation, which is also known as a program operation, is an operation for accumulating electrons in a floating gate of a transistor that forms a memory cell. The erase operation is an operation for discharging the electrons accumulated in the floating gate of a transistor. The flash memory device accumulates or discharges electrons in or from floating gates of transistors through the write operation and the erase operation, and each memory cell has a data distribution corresponding to a data '0' or a data '1'.

Subsequently, as described above, one memory cell stores a data of '0' or a data of '1'. In other words, one memory cell stores a one-bit data, and this memory cell is called a single-level cell. However, recent trend is a multi-level cell where more than one-bit data is stored in one memory cell. A single-level cell needs one reference voltage to decide whether the data stored in a memory cell is '0' or '1'. A multi-level cell needs a plurality of reference voltages to decide whether the data stored in a memory cell is '00', '01', '10' or '11'.

It takes a relatively short time to read or write a data from or in a memory cell of a single-level cell, but a multi-level cell requires several times as long as the single-level cell to read or write a data from or in a memory cell of a multi-level cell.

SUMMARY

Embodiments of the present invention are directed to a method for increasing the performance of a non-volatile memory device while not losing capacity of a multi-level cell-type non-volatile memory device.

In accordance with an embodiment of the present invention, a memory system includes: a non-volatile memory device that includes a normal region in which Most Significant Bits (MSBs) and Least Significant Bits (LSBs) stored in memory cells are simultaneously accessed, a hot region in which MSBs stored in memory cells are accessed, and a cold region in which LSBs stored in the memory cells are accessed; and a memory controller that controls the non-volatile memory device, wherein the memory controller includes: a read/write counter that counts the number of times that a read operation is performed and the number of times that a write operation is performed for each of a plurality of logical clusters to thereby produce a counting result; a region selector that maps each of the logical clusters to one region among the normal region, the hot region and the cold region based on the counting result obtained in the read/write counter to thereby produce mapping data; and a cluster mapping table that stores the mapping data obtained in the region selector.

The hot region and the cold region may share memory cells, and a set of the MSBs of the shared memory cells may be the hot region, and a set of the LSBs of the shared memory cells may be the cold region.

The region selector may map a logical cluster having a great number of write operations performed thereon to the normal region, map a logical cluster having a small number of write operations performed thereon and a great number of read operations performed thereon to the hot region, and map a logical cluster having a small number of write operations performed thereon and a small number of read operations performed thereon to the cold region.

The region selector may map logical clusters whose number of write operations is equal to or greater than a first threshold value to the normal region, and map a logical cluster whose number of read operations is equal to or greater than a second threshold value and a value obtained by dividing the number of read operations by the number of write operations is equal to or greater than a third threshold value to the hot region among the logical clusters whose number of write operations is smaller than the first threshold value, and map a logical cluster whose number of read operations is equal to or greater than the second threshold value and a value obtained by dividing the number of read operations by the number of write operations is smaller than the third threshold value to the cold region among the logical clusters whose number of write operations is smaller than the first threshold value.

The plurality of the logical clusters may be mapped to the normal region as default values.

The memory controller may further include: an immigration manager that immigrates data of a logical cluster whose mapping is changed by the region selector into a changed region.

The number of times that a read operation is performed and the number of times that a write operation is performed for each of the plurality of the logical clusters that are counted by the read/write counter may be decreased at a predetermined period.

The capacities of the normal region, the hot region, and the cold region may be controllable in the non-volatile memory device.

Each of the plurality of the logical clusters may include one or more logical blocks.

The memory controller may further include: a host interface for communication with the host; a flash translation layer (FTL); and a memory interface for communication with the non-volatile memory device.

a method for operating a memory system including a memory controller and a non-volatile memory device includes: transferring a read operation request for performing a read operation on a predetermined logical page from a host; detecting in the memory controller whether a logical cluster to which the predetermined logical page belongs is mapped to a normal region of the non-volatile memory device in which Most Significant Bits (MSBs) and Least Significant Bits (LSBs) stored in memory cells are simultaneously accessed, a hot region in which MSBs stored in memory cells are accessed, or a cold region in which LSBs stored in memory cells are accessed; when the logical cluster to which the predetermined logical page belongs is mapped to the normal region, reading the MSBs and the LSBs from the memory cells which correspond to the predetermined logical page in the normal region of the non-volatile memory device; when the logical cluster to which the predetermined logical page belongs is mapped to the hot region, reading the MSBs from the memory cells which correspond to the predetermined logical page in the hot region of the non-volatile memory device; when the logical cluster to which the predetermined logical page belongs is mapped to the cold region, reading the LSBs from the memory cells which correspond to the predetermined logical page in the cold region of the non-volatile memory device; and increasing a counted number of times that a read operation is performed on the logical cluster to which the predetermined logical page belongs in the memory controller.

The method may further include: checking out in the memory controller whether mapping between the logical clusters and the normal, hot and cold regions of the non-volatile memory device needs to be changed; mapping a logical cluster whose mapping to one region of the non-volatile memory device among the normal, hot and cold regions needs to be changed to a proper region in the memory controller; and immigrating data of the logical cluster whose mapping is changed in the non-volatile memory device under control of the memory controller.

In accordance with another embodiment of the present invention, a method for operating a memory system including a memory controller and a non-volatile memory device includes: transferring a write operation request for performing a write operation on a predetermined logical page from a host; detecting in the memory controller whether a logical cluster to which the predetermined logical page belongs is mapped to a normal region of the non-volatile memory device in which Most Significant Bits (MSBs) and Least Significant Bits (LSBs) stored in memory cells are simultaneously accessed, a hot region in which MSBs stored in memory cells are accessed, or a cold region in which LSBs stored in memory cells are accessed; when the logical cluster to which the predetermined logical page belongs is mapped to the normal region, programming the MSBs and the LSBs in the memory cells which correspond to the predetermined logical page in the normal region of the non-volatile memory device; when the logical cluster to which the predetermined logical page belongs is mapped to the hot region, programming the MSBs in the memory cells which correspond to the predetermined logical page in the hot region of the non-volatile memory device; when the logical cluster to which the predetermined logical page belongs is mapped to the cold region, programming the LSBs in the memory cells which correspond to the predetermined logical page in the cold region of the non-volatile memory device; and increasing a counted number of times that a write operation is performed on the logical cluster to which the predetermined logical page belongs in the memory controller.

The method may further include: checking out in the memory controller whether mapping between the logical clusters and the normal, hot and cold regions of the non-volatile memory device needs to be changed; mapping a logical cluster whose mapping to one region of the non-volatile memory device among the normal, hot and cold regions needs to be changed to a proper region in the memory controller; and immigrating data of the logical cluster whose mapping is changed in the non-volatile memory device under control of the memory controller.

DETAILED DESCRIPTION

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

In the first place, terms used in the following embodiments of the present invention are described, hereafter, to help understanding.

Page: A page is a unit for a read operation and a write operation in a non-volatile memory device. There may be logical pages and physical pages. One logical page may be mapped to one physical page in a non-volatile memory device.

Block: A block is a unit for an erase operation in a non-volatile memory device. A block includes a plurality of pages. There may be logical blocks and physical blocks. One logical block may be mapped to one physical block in a non-volatile memory device.

Logical cluster: A logical cluster is a set of one or more logical blocks. In the following embodiments, the number of times that a read operation is performed and the number of times that a write operation is performed are counted for each logical cluster. In this way, logical clusters are mapped to one region among a plurality of regions.

Normal region: A normal region may be a region in which Most Significant Bits (MSBs) and Least Significant Bits (LSBs) are accessed simultaneously in a multi-level cell-type non-volatile memory device. A normal region may operate in the same way that a conventional multi-level, cell-type non-volatile memory device does.

Hot region: A hot region is a region in which MSBs alone are accessed in a multi-level cell-type non-volatile memory device. When a hot region is read, only the MSBs that may be read quickly are accessed. Therefore, an operation as fast as a single-level cell-type non-volatile memory device is performed.

Cold region: A cold region is a region in which LSBs alone are accessed in a multi-level cell-type non-volatile memory device. Since only the LSBs are accessed in the cold region, the cold region operates more slowly than the hot region.

Figure 1:
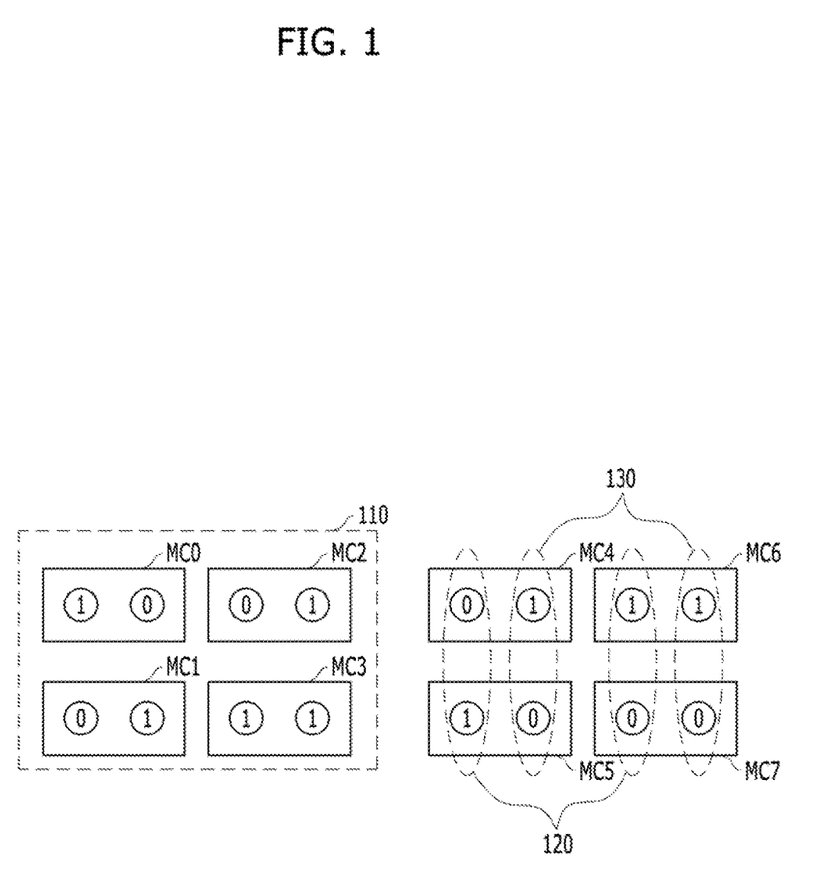
FIG. 1 illustrates a normal region, a hot region, and a cold region of a non-volatile memory device.

FIG. 1 illustrates a normal region 110, a hot region 120, and a cold region 130 of a non-volatile memory device. As an example, it is assumed in the embodiment of FIG. 1 that a non-volatile memory device is provided with 8 memory cells and that the size of a page is 2 bits.

The normal region 110 may include 4 memory cells MC0 to MC3. Since one memory cell may store a two-bit data, each of the memory cells MC0 to MC3 may be one page in the normal region 110.

The hot region 120 may include the MSBs of 4 memory cells MC4 to MC7. In the hot region 120, the MSBs of the memory cell MC4 and the memory cell MC5 may form one page, and the MSBs of the memory cell MC6 and the memory cell MC7 may form another page.

The cold region 130 may include the LSBs of the four memory cells MC4 to MC7. In the cold region 130, the LSBs of the memory cell MC4 and the memory cell MC5 may form one page, and the LSBs of the memory cell MC6 and the memory cell MC7 may form another page.

The hot region 120 and the cold region 130 may share the same memory cells MC4 to MC7, with the MSBs of the shared memory cells MC4 to MC7 becoming the hot region 120, and the LSBs of the shared memory cells MC4 to MC7 becoming the cold region 130. Therefore, the hot region 120 and the cold region 130 may have the same capacity.

The MSB and the LSB in the 2-bit data stored in a memory cell may be conceptually opposite to each other. A bit that may be read at once between the 2-bit data stored in a memory cell becomes the MSB, and the other bit is called the LSB. In other words, a bit that may be quickly read between the 2-bit data stored in a memory cell is the MSB, and the bit that is not as quickly read as the MSB becomes the LSB.

FIG. 1 shows an embodiment of the present invention where the non-volatile memory device includes 8 memory cells and the size of each page is 2 bits, but the embodiment is presented to simply describe the concept and spirit of the present invention and it is obvious to those skilled in the art that the non-volatile memory device may have a capacity of more than tens to hundreds of gigabits (Gb) and the size of each page may be greater than approximately 4 kilobytes (Kb).

Figure 2:
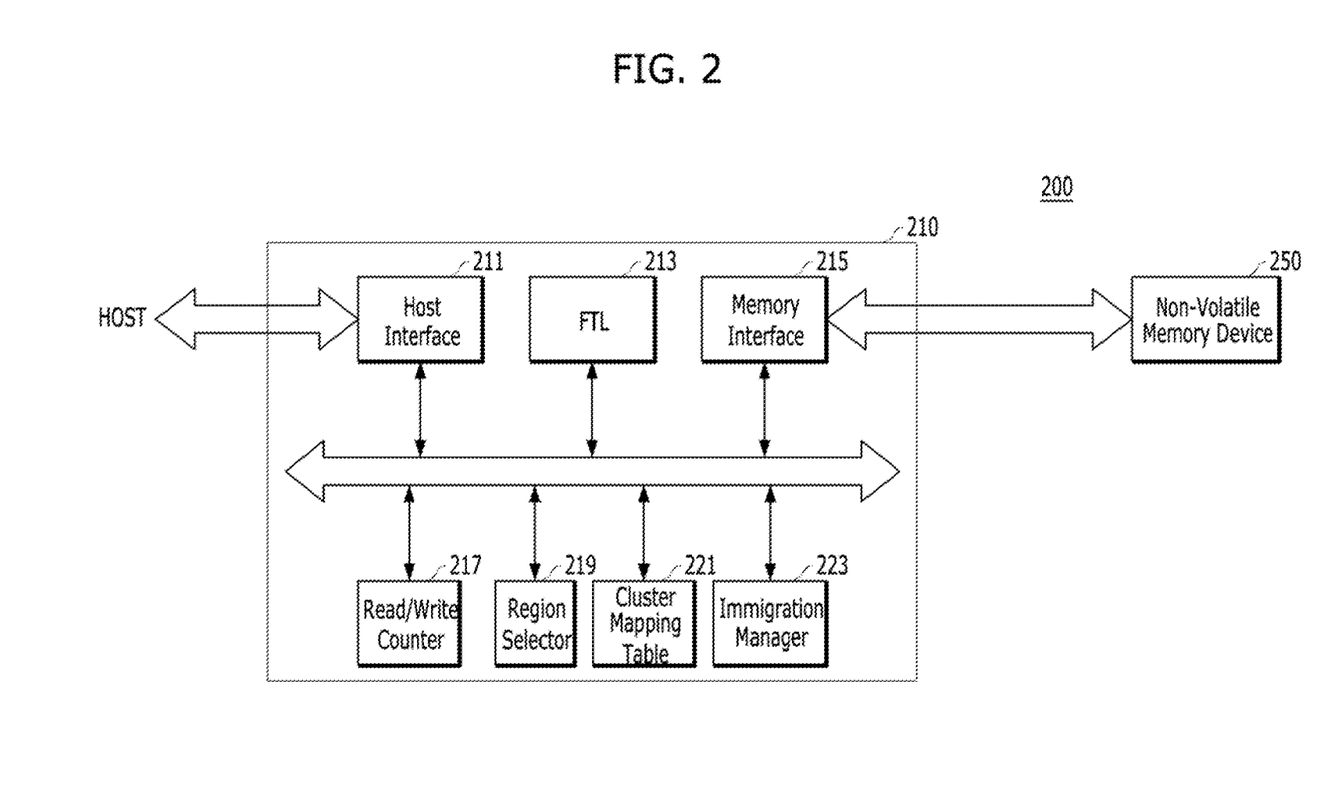
FIG. 2 is a block diagram illustrating a memory system, in accordance with an embodiment of the present invention.

FIG. 2 is a block diagram illustrating a memory system 200 in accordance with an embodiment of the present invention.

Referring to FIG. 2, the memory system 200 may include a memory controller 210 and a non-volatile memory device 250.

The non-volatile memory device 250 may include a normal region, a hot region, and a cold region. As described above, the normal region is a region that is simultaneously accessed by the MSB and the LSB, the hot region is a region that is accessed by the MSB, and the cold region is a region that is accessed by the LSB.

The memory controller 210 may control the non-volatile memory device 250. The memory controller 210 may include a host interface 211, a flash translation layer (FTL) 213, a memory interface 215, a read/write counter 217, a region selector 219, a cluster mapping table 221, and an region manager 223 all coupled electrically via an internal bus.

The host interface 211 may be an interface suitable for enabling communication between a host HOST and the memory controller 210.

The FTL 213 may be a module that manages the non-volatile memory device 250. The non-volatile memory device 250 provides a fast read operation rate at a relatively low price, which is advantageous. However, an erase operation has to antecede the write operation when a data is programmed in the non-volatile memory device 250, and the data unit for the erase operation is a block which is greater than a page which is the data unit for the write operation. These properties of the non-volatile memory device 250 make it difficult to use the typical file system for a hard disk as it is. For this reason, the FTL 213 is employed for making compatible the file system and the non-volatile memory device 250 with each other.

The memory interface 215 may be an interface suitable for enabling communication between the memory controller 210 and the non-volatile memory device 250.

The read/write counter 217 may count the number of times that a read operation is performed and the number of times that a write operation is performed for each logical cluster. Each logical cluster may include a plurality of logical blocks. The number of times that a read operation is performed and the number of times that a write operation is performed for each logical cluster, counted by the read/write counter 217, may be used in the region selector 219. The number of times that a read operation is performed and the number of times that a write operation is performed for each logical cluster, which is counted by the read/write counter 217, may be decreased at a predetermined period to dismiss excessively old data. For example, the number of times that a read operation is performed and the number of times that a write operation is performed for each logical cluster may be decreased by approximately 20% or by a predetermined value when a predetermined time passes.

The region selector 219 may map each logical cluster to one region among the normal region, the hot region, and the cold region based on the counting result of the read/write counter 217. For example, the region selector 219 may map the logical clusters to the regions based on the conditions shown in Table 1.

TABLE 1

|  |  | Number of Read Operations | |
| --- | --- | --- | --- |
|  |  | Great | Small |
| Number of Write Operations | Great | Normal Region | Normal Region |
|  | Small | Hot Region | Cold Region |

Referring to Table 1, logical clusters with a great number of times that a write operation is performed may be mapped to the normal region. The logical clusters with great numbers of times that a write operation is performed are mapped to the normal region, because being accessed only by the MSB or being accessed only by the LSB may make the operation slow in a write operation.

Logical clusters with a small number of write operations and a great number of read operations may be mapped to the hot region. Since only the MSB accesses to the hot region, the read operation may be performed fast.

Logical clusters with a small number of write operations and a small number of read operations as well may be mapped to the cold region. Since the logical clusters with a small number of write operations and a small number of read operations has a small number of accesses, the operation performance of the non-volatile memory device may be scarcely decreased although they are mapped to the cold region.

Whether the number of times that a read operation is performed and the number of times that a read operation is performed are small or great may be decided based on absolute standards or relative standards. In the following description (1), (3) is an example of deciding whether the number of read operations and the number of write operations are small or great.

(1) Whether the number of times that a write operation is performed is small or great may be decided based on a threshold value A (e.g., 1000 times). The logical clusters whose number of times that a write operation is performed is equal to or greater than the threshold value A may be classified as the logical clusters with a great number of write operations and mapped to the normal region. On the other hand, the logical clusters whose number of times that a write operation is performed is less than the threshold value A may be classified as the logical clusters with a small number of write operations.

(2) Among the logical clusters whose number of times that a write operation is performed is less than the threshold value A, the logical clusters whose number of times that a read operation is performed is equal to or greater than B times (e.g., 500 times) and a value obtained by dividing the number of read operations by the number of the write operations is equal to or greater than a threshold value C (e.g., 5) ((the number of read operations/the number of write operations)≥threshold value C) become the logical clusters with a small number of write operations and a great number of read operations and are mapped to the hot region.

(3) Among the logical clusters whose number of times that a write operation is performed is less than the threshold value A, the logical clusters whose number of times that a read operation is performed is equal to or greater than B times (e.g., 500 times) and a value obtained by dividing the number of read operations by the number of the write operations is less than the threshold value C (e.g., 5) ((the number of read operations/the number of write operations) <threshold value C) become the logical clusters with a small number of write operations and a small number of read operations and are mapped to the cold region.

The logical clusters are mapped to the normal region as default values, and the mapped regions may be changed according to the conditions of (1) to (3). The region selector 219 may change the mapping of the logical clusters to the regions by checking out whether the conditions of (1) to (3) are satisfied or not.

The cluster mapping table 221 may store mapping data of the region selector 219.

When there is a logical cluster whose mapping is changed by the region selector 219, the region manager 223 may move the data of the logical cluster to a newly mapped region.

Since the normal region, the hot region, and the cold region are divided by how they are accessed in the non-volatile memory device 250, the capacities of the regions may be changed even in the middle of an operation of the memory system 200. For example, the normal region may be decreased in the middle of an operation of the memory system 200 while the hot and cold regions may be increased. As another example, the hot and cold regions may be decreased while the normal region is increased.

In the memory system 200, since the logical clusters with frequently performed read operations and relatively less performed write operations are mapped to the hot region in the memory system 200, the read operations of the logical clusters may be performed as fast as in a single-level, cell-type, non-volatile memory device and the performance of the memory system 200 may thus be improved.

Figure 3:
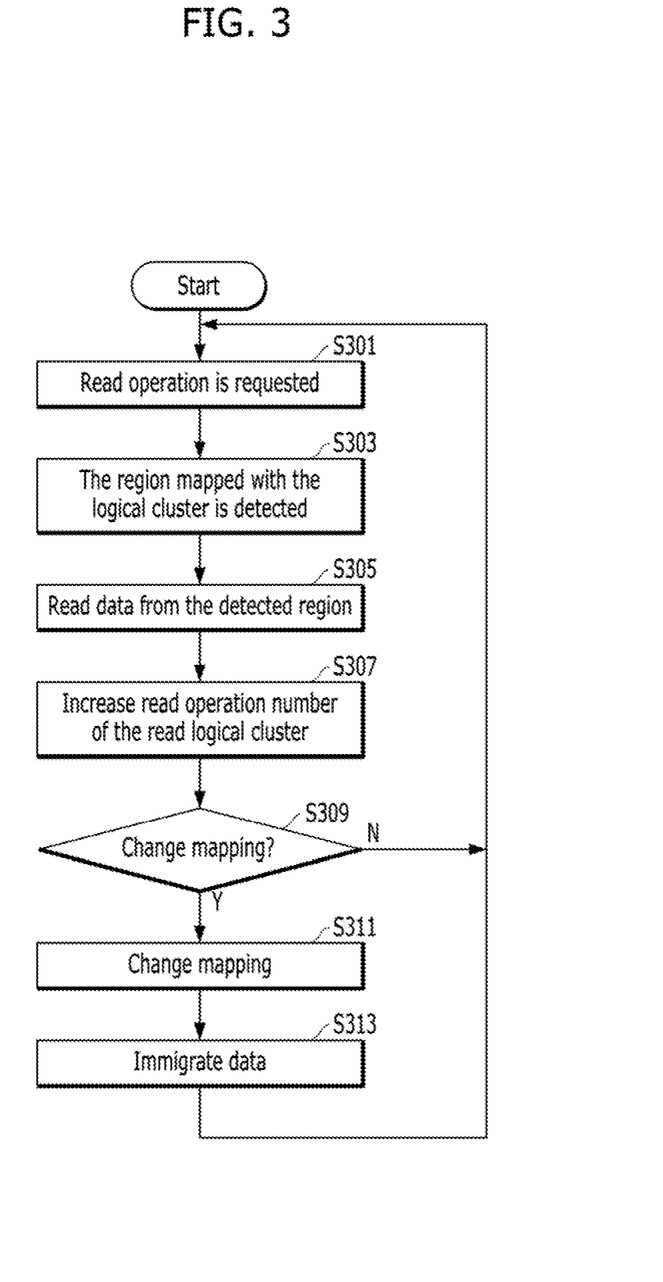
FIG. 3 is a flowchart of a read operation of a memory system, according to an embodiment of the present invention.

FIG. 3 is a flowchart illustrating a read operation of the memory system, in accordance with an embodiment of the present invention. For example, FIG. 3 may illustrate a read operation of the memory system 200 in FIG. 2.

Referring to FIG. 3, a host may request the memory controller 210 to perform a read operation on a predetermined logical page in step S301.

In step S303, it is detected based on the cluster mapping table 221 whether the logical cluster to which the logical page requested to be read belongs is mapped to the normal region, the hot region, or the cold region of the non-volatile memory device 250.

In step S305, data may be read from a physical page that corresponds to the logical page requested to be read in the region detected in the step S303. When it is detected in the step S303 that the logical cluster to which the logical page requested to be read belongs is mapped to the normal region, both MSBs and LSBs may be read from the memory cells corresponding to the logical page requested to be read. When it is detected in the step S303 that the logical cluster to which the logical page requested to be read belongs is mapped to the hot region, the MSBs may be read from the memory cells corresponding to the logical page requested to be read. When it is detected in the step S303 that the logical cluster to which the logical page requested to be read belongs is mapped to the cold region, the LSBs may be read from the memory cells corresponding to the logical page requested to be read.

After the read operation is performed, the read/write counter 217 may increase the number of read operations for the logical cluster to which the logical page on which the read operation is performed belongs in step S307.

Subsequently, in step S309, the region selector 219 may check out whether the mapping between the logical clusters and the regions of the non-volatile memory device 250 needs to be changed or not.

When it is detected that the mapping needs to be changed, the region selector 219 may re-map the logical cluster whose mapping to the region needs to be changed to a proper region in step S311.

In step S313, the region manager 223 may move the data of the logical cluster whose mapping is changed in step S311.

Figure 4:
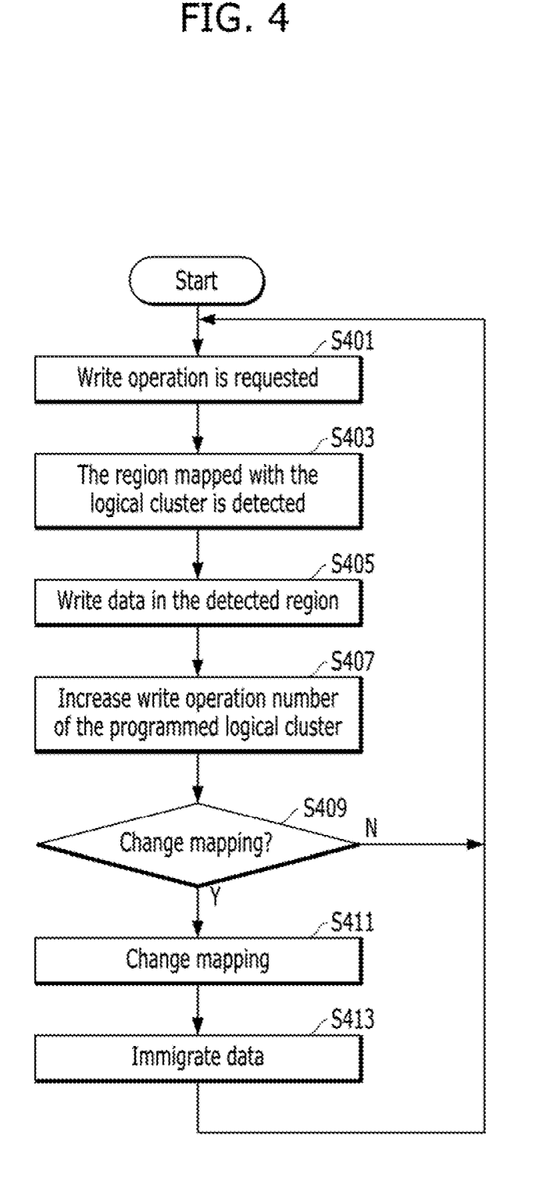
FIG. 4 is a flowchart of a write operation of the memory system, according to an embodiment of the present invention.

FIG. 4 is a flowchart illustrating a write operation of the memory system in accordance with an embodiment of the present invention. For example, FIG. 4 may illustrate a write operation of the memory system 200 in FIG. 2.

Referring to FIG. 4, a host may request the memory controller 210 to perform a write operation on a predetermined logical page in step S401.

In step S403, it is detected based on the cluster mapping table 221 whether the logical cluster to which the logical page requested to be programmed belongs is mapped to the normal region, the hot region, or the cold region of the non-volatile memory device 250.

In step S405, write data may be programmed in a physical page that corresponds to the logical page requested to be programmed in the region detected in the step S403. When it is detected in the step S403 that the logical cluster to which the logical page requested to be programmed belongs is mapped to the normal region, the write data may be programmed in both MSBs and LSBs of the memory cells corresponding to the logical page requested to be programmed. When it is detected in the step S403 that the logical cluster to which the logical page requested to be programmed belongs is mapped to the hot region, the write data may be programmed in the MSBs of the memory cells corresponding to the logical page requested to be programmed. When it is detected in the step S403 that the logical cluster to which the logical page requested to be programmed belongs is mapped to the cold region, the write data may be programmed in the LSBs of the memory cells corresponding to the logical page requested to be programmed.

After the write operation is performed, the read/write counter 217 may increase the number of write operations for the logical cluster to which the programmed logical page belongs in step S407.

Subsequently, in step S409, the region selector 219 may check out whether the mapping between the logical clusters and the regions of the non-volatile memory device 250 needs to be changed or not.

When it is detected that the mapping needs to be changed, the region selector 219 may re-map the logical cluster whose mapping to the region needs to be changed to a proper region in step S411.

In step S413, the region manager 223 may move the data of the logical cluster whose mapping is changed in step S411.

According to the embodiments of the present invention, the performance of a non-volatile memory device may be increased without reducing the capacity of a multi-level, cell-type, non-volatile memory device.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
a non-volatile memory device including a normal region in which Most Significant Bits (MSBs) and Least Significant Bits (LSBs) stored in memory cells are simultaneously accessed, a hot region in which MSBs stored in memory cells are accessed, and a cold region in which LSBs stored in memory cells are accessed; and
a memory controller for controlling the non-volatile memory device,
wherein the memory controller includes:
a read/write counter for counting the number of times that a read operation is performed and the number of times that a write operation is performed for each of a plurality of logical clusters to thereby produce a counting result; and
a region selector for mapping each of the logical clusters to one region among the normal region, the hot region and the cold region based on the counting result to thereby produce mapping data,
wherein the region selector maps logical clusters whose number of write operations is equal to or greater than a first threshold value to the normal region, and
maps a logical cluster whose number of read operations is equal to or greater than a second threshold value and a value obtained by dividing the number of read operations by the number of write operations is equal to or greater than a third threshold value to the hot region among the logical clusters whose number of write operations is smaller than the first threshold value, and
maps a logical cluster whose number of read operations is equal to or greater than the second threshold value and a value obtained by dividing the number of read operations by the number of write operations is smaller than the third threshold value to the cold region among the logical clusters whose number of write operations is smaller than the first threshold value.

2. The memory system of claim 1, further comprising:
a cluster mapping table for storing the mapping data obtained in the region selector.

3. The memory system of claim 1, wherein the hot region and the cold region share memory cells, and
a set of the MSBs of the shared memory cells is the hot region, and a set of the LSBs of the shared memory cells is the cold region.

4. The memory system of claim 1, wherein the plurality of the logical clusters are mapped to the normal region as default values.

5. The memory system of claim 1, wherein the memory controller further includes:
a region manager for moving data of a logical cluster whose mapping is changed by the region selector into a changed region.

6. The memory system of claim 5, wherein the memory controller further includes:
a host interface for communication with the host;
a flash translation layer (FTL); and
a memory interface for communication with the non-volatile memory device.

7. The memory system of claim 1, wherein the number of times that a read operation is performed and the number of times that a write operation is performed for each of the plurality of the logical clusters that are counted by the read/write counter are decreased at a predetermined period.

8. The memory system of claim 1, wherein capacities of the normal region, the hot region, and the cold region are controllable in the non-volatile memory device.

9. The memory system of claim 1, wherein each of the plurality of the logical clusters includes one or more logical blocks.

10. A method for operating a memory controller, comprising:
receiving a read operation request for performing a read operation on a predetermined logical page of a non-volatile memory device from a host, wherein the non-volatile memory device comprises a plurality of logical clusters;

detecting whether a logical cluster to which the predetermined logical page belongs is mapped to a normal region of the non-volatile memory device in which Most Significant Bits (MSBs) and Least Significant Bits (LSBs) stored in memory cells are accessed simultaneously, a hot region in which MSBs stored in memory cells are accessed, or a cold region in which LSBs stored in memory cells are accessed;

when the logical cluster to which the predetermined logical page belongs is mapped to the normal region, reading the MSBs and the LSBs from the memory cells which correspond to the predetermined logical page in the normal region of the non-volatile memory device;

when the logical cluster to which the predetermined logical page belongs is mapped to the hot region, reading the MSBs from the memory cells which correspond to the predetermined logical page in the hot region of the non-volatile memory device; and when the logical cluster to which the predetermined logical page belongs is mapped to the cold region, reading the LSBs from the memory cells which correspond to the predetermined logical page in the cold region of the non-volatile memory device, wherein logical clusters whose counted value of the number of write operations performed is equal to or greater than a first threshold value are mapped to the normal region, and a logical cluster whose counted value of the number of read operations performed is equal to or greater than a second threshold value and a value obtained by dividing the number of read operations by the number of write operations is equal to or greater than a third threshold value is mapped to the hot region among the logical clusters whose number of write operations is smaller than the first threshold value, and a logical cluster whose counted value of the number of read operations performed is equal to or greater than the second threshold value and a value obtained by dividing the number of read operations by the number of write operations is smaller than the third threshold value is mapped to the cold region among the logical clusters whose number of write operations is smaller than the first threshold value.

11. The method of claim 10, further comprising:
increasing a counted number of times that a read operation is performed on the logical cluster to which the predetermined logical page belongs.

12. The method of claim 10, further comprising:
checking out whether mapping between the logical clusters and the normal, hot and cold regions of the non-volatile memory device needs to be changed;
mapping a logical cluster whose mapping to one region of the non-volatile memory device among the normal, hot and cold regions needs to be changed to a proper region; and
moving data of the logical cluster whose mapping is changed in the non-volatile memory device.

13. A method for operating a memory controller, comprising:
receiving a write operation request for performing a write operation on a predetermined logical page of a non-volatile memory device from a host, wherein the non-volatile memory device comprises a plurality of logical clusters;

detecting whether a logical cluster to which the predetermined logical page belongs is mapped to a normal region of the non-volatile memory device in which Most Significant Bits (MSBs) and Least Significant Bits (LSBs) stored in memory cells are simultaneously accessed, a hot region in which MSBs stored in memory cells are accessed, or a cold region in which LSBs stored in memory cells are accessed;

when the logical cluster to which the predetermined logical page belongs is mapped to the normal region, programming the MSBs and the LSBs in the memory cells which correspond to the predetermined logical page in the normal region of the non-volatile memory device;

when the logical cluster to which the predetermined logical page belongs is mapped to the hot region, programming the MSBs in the memory cells which correspond to the predetermined logical page in the hot region of the non-volatile memory device; and when the logical cluster to which the predetermined logical page belongs is mapped to the cold region, programming the LSBs in the memory cells which correspond to the predetermined logical page in the cold region of the non-volatile memory device, wherein logical clusters whose counted value of the number of write operations performed is equal to or greater than a first threshold value are mapped to the normal region, and a logical cluster whose counted value of the number of read operations performed is equal to or greater than a second threshold value and a value obtained by dividing the number of read operations by the number of write operations is equal to or greater than a third threshold value is mapped to the hot region among the logical clusters whose number of write operations is smaller than the first threshold value, and a logical cluster whose counted value of the number of read operations performed is equal to or greater than the second threshold value and a value obtained by dividing the number of read operations by the number of write operations is smaller than the third threshold value is mapped to the cold region among the logical clusters whose number of write operations is smaller than the first threshold value.

14. The method of claim 13, further comprising:
increasing a counted number of times that a write operation is performed on the logical cluster to which the predetermined logical page belongs.

15. The method of claim 13, further comprising:
checking out whether mapping between the logical clusters and the normal, hot and cold regions of the non-volatile memory device needs to be changed;
mapping a logical cluster whose mapping to one region of the non-volatile memory device among the normal, hot and cold regions needs to be changed to a proper region; and
moving data of the logical cluster whose mapping is changed in the non-volatile memory device.

* * * * *